US008433959B1

(12) United States Patent
Garfinkel et al.

(10) Patent No.: US 8,433,959 B1
(45) Date of Patent: Apr. 30, 2013

(54) METHOD FOR DETERMINING HARD DRIVE CONTENTS THROUGH STATISTICAL DRIVE SAMPLING

(75) Inventors: Simson Leon Garfinkel, Arlington, VA (US); Alexander Joseph Nelson, Santa Cruz, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 478 days.

(21) Appl. No.: 12/876,416

(22) Filed: Sep. 7, 2010

Related U.S. Application Data

(60) Provisional application No. 61/240,751, filed on Sep. 9, 2009.

(51) Int. Cl.
*G06F 11/00* (2006.01)
(52) U.S. Cl.
USPC .......................................... 714/718; 707/899
(58) Field of Classification Search .................. 714/718; 707/899
See application file for complete search history.

(56) References Cited

U.S. PATENT DOCUMENTS

| | | | |
|---|---|---|---|
| 5,878,426 A | 3/1999 | Plasek et al. | |
| 6,278,989 B1 | 8/2001 | Chaudhuri et al. | |
| 6,393,568 B1 * | 5/2002 | Ranger et al. | 713/188 |
| 6,741,996 B1 * | 5/2004 | Brechner et al. | 1/1 |
| 6,785,684 B2 | 8/2004 | Adbo | |
| 6,889,221 B1 | 5/2005 | Luo et al. | |
| 6,988,108 B2 | 1/2006 | Bernhardt et al. | |
| 6,993,516 B2 | 1/2006 | Haas et al. | |
| 7,533,131 B2 * | 5/2009 | Thomas et al. | 1/1 |
| 7,660,808 B2 * | 2/2010 | Brechner et al. | 707/999.102 |
| 7,743,417 B2 * | 6/2010 | Williams | 726/24 |
| 7,890,796 B2 * | 2/2011 | Pawar et al. | 714/6.13 |
| 7,930,749 B2 * | 4/2011 | Ballard et al. | 726/24 |
| 8,375,006 B2 * | 2/2013 | Terry | 707/688 |
| 2007/0116267 A1 | 5/2007 | Speirs et al. | |
| 2007/0168455 A1 | 7/2007 | Sun | |
| 2007/0255758 A1 | 11/2007 | Zheng et al. | |
| 2008/0065811 A1 | 3/2008 | Jahangiri | |

OTHER PUBLICATIONS

"TrueCrypt is now Detectable." Innovations Blog. Apr. 22, 2009. 2 pp. [retrieved on Sep. 8, 2010]. Retrieved from the Internet: <URL: http://www.forensicinnovations.com/blog/?tag=truecrypt>.
"FITools for Windows." [retrieved on Sep. 8, 2010]. 2 pp. Retrieved from the Internet: <URL: http://www.forensicinnovations.com/fitools.html>.
Roussev, Vassil, and Garfinkel, S. "File Classification Fragment—The Case for Specialized Approaches." Fourth International IEEE Workshop on Systematic Approaches to Digital Forensic Engineering, 2009. SADFE '09. May 21, 2009. pp. 1-13. [retrieved on Sep. 8, 2010]. Retrieved from the Internet: <URL: http://ieeexplore.ieee.org/stamp/stamp.jsp?tp=&arnumber=5341545&isnumber=5341544>.
Calhoun, W.C., and Coles, D. "Predicting the types of file fragments." Proceedings of the 2008 DFR WWS Conference. Aug. 2008. pp. S14-S20. [retrieved on Sep. 8, 2010]. Retrieved from the Internet: <URL: http://dfrws.org/ 2008/proceedings/p14-calhoun.pdf>.

(Continued)

*Primary Examiner* — Stephen M Baker
(74) *Attorney, Agent, or Firm* — Lisa A. Norris

(57) ABSTRACT

A method for rapidly characterizing the forensic contents of a digital storage device using statistical drive sampling.

13 Claims, 5 Drawing Sheets

OTHER PUBLICATIONS

Garfinkel, Simson, Nelson, A., White, D., and Roussev, V. "Using purpose-built functions and block hashes to enable small block and sub-file forensics." DFRWS 2010. Aug. 2-4, 2010. pp. 1-12. [retrieved on Sep. 8, 2010]. Retrieved from the Internet: <URL:http://simson.net/clips/academic/2010.DFRWS.SmallBlockForensics.pdf>.

Karresand, M., and Shahmehri, N. "File Type Identification of Data Fragments by Their Binary Structure." Information Assurance Workshop, 2006 IEEE. Jun. 21-23, 2006. pp. 140-147. [retrieved on Sep. 8, 2010]. Retrieved from the Internet: <URL: http://ieeexplore.ieee.org/stamp/stamp.jsp?tp=&arnumber=1652088&isnumber=34632>.

Karresand, M., and Shahmehri, N. "Oscar-file type identification of binary data in disk clusters and RAM pages." Proceedings of IFIP International Information Security Conference: Security and Privacy in Dynamic Environments (SEC2006). May 22-24, 2006. pp. 413-424. [retrieved on Sep. 8, 2010]. Retrieved from the Internet: <URL: http://www.springerlink.com/content/671k60145h1751w4/fulltext.pdf>.

Li, W.J., Wang, K., Stolfo, and S.J. Herzon, B. "Fileprints: identifying file types by n-gram analysis." Information Assurance Workshop, 2005. IAW '05. Proceedings from the Sixth Annual IEEE SMC. Jun. 15-17, 2005. pp. 64-71. [retrieved on Sep. 8, 2010]. Retrieved from the Internet: <URL: http://ieeexplore.ieee.org/stamp/stamp.jsp?tp=&arnumber=1495935&isnumber=32124>.

McDaniel, M., and Heydari, M.H. "Content Based File Type Detection Algorithms." Proceedings of the 36th Annual Hawaii International Conference on System Sciences, 2003. Jan. 6-9, 2003.10 pp. [retrieved on Sep. 8, 2010]. Retrieved from the Internet: <URL: http://ieeexplore.ieee.org/stamp/stamp.jsp?tp=&arnumber=1174905&isnunnber=26341>.

Moody, S.J., and Erbacher, R.F. "Sádi—Statistical Analysis for Data Type Identification," Third International Workshop on Systematic Approaches to Digital Forensic Engineering, 2008. SADFE '08. May 22, 2008. pp. 41-54. [retrieved on Sep. 8, 2010]. Retrieved from the Internet: <URL: http://ieeexplore.ieee.org/stamp/stamp.jsp?tp=&arnumber=4545366&isnumber=4545352>.

Erbacher, R., and Mulholland, J. "Identification and Localization of Data Types Within Large-Scale File Systems." Second International Workshop on Systematic Approaches to Digital Forensic Engineering, 2007. SADFE 2007.Apr. 10-12, 2007. pp. 55-70. [retrieved on Sep. 8, 2010]. Retrieved from the Internet: <URL: http://ieeexplore.ieee.org/stamp/stamp.jsp?tp=&arnumber=4155350&isnumber=4155338>.

Veenman, D.J. "Statistical Disk Cluster Classification for File Carving." Third International Symposium on Information Assurance and Security, 2007. IAS 2007. Aug. 29-31, 2007. pp. 393-398. [retrieved on Sep. 8, 2010]. Retrieved from the Internet: <URL: http://ieeexplore.ieee.org/stamp/stamp.jsp?tp=&arnumber=4299805&isnumber=4299732>.

"Drive Analysis in a Flash." Abstract, p. 12. Basis Technology Government Users Conference Brochure. Basis Technology. pp. 1-15. [retrieved on Sep. 16, 2010]. Retrieved from the Internet: <URL: http://www.basistechnology.com/conference/2009/Basis-Tech-User-Conference-2009.pdf>.

Garfinkel, Simson. "Drive Analysis in a Flash." Slide Presentation. Basis Technology Government Users Conference. Jun. 9, 2010. pp. 1-77.

Garfinkel, Simson. "Drive Analysis in a Flash." Slide Presentation. Basis Technology Government Users Conference. Jun. 9, 2010. pp. 1-43.

* cited by examiner

METHOD FOR DETERMINING HARD DRIVE CONTENTS THROUGH STATISTICAL DRIVE SAMPLING

CROSS-REFERENCE TO RELATED APPLICATIONS

This application claims the benefit of U.S. Provisional Application No. 61/240,751, filed Sep. 9, 2009, which is hereby incorporated in its entirety by reference.

BACKGROUND OF THE INVENTION

1. Field of the Invention

The present invention relates generally to determination of computer storage device contents. More particularly, the invention relates to determination of computer storage device contents using statistical drive sampling.

2. Description of the Related Art

Today there are increasing requirements to quickly, reliably, and concisely determine the contents of data storage de-vices, such as computer hard disk drives. Currently, hard disk drive content determination is handled either by exhaustively reading the entire contents of the hard disk drive, or by superficially examining the file system through a file browser. As disk drive data storage capacity continues to increase, timely determination of disk content using the above conventional methods is becoming more difficult. For example, over the last five years, the time to read an average computer hard disk drive has tripled such that it now takes 2.5 hours to read a one terabyte 7,200 rpm SATA (Serial Advanced Technology Attachment) drive from end to end.

SUMMARY OF THE INVENTION

Embodiments in accordance with the invention rapidly characterize the forensic contents of a hard drive or other random-access storage device using statistical sampling. In one embodiment, a method for determining hard drive contents through statistical drive sampling includes: accessing a hard drive; determining the total number of blocks on the hard drive; generating a list of random numbers, the list of random numbers including a plurality of random numbers; sorting the list of random numbers, wherein the sorting positions each of the plurality of random numbers in the list of random numbers in a selected order; selecting each of the plurality of random numbers in the list of random numbers according to the order; reading a block on the hard drive corresponding to each of the plurality of random numbers; classifying each selected block by a type; tabulating each block type; and generating a statistical determination of the contents of the hard drive based on the tabulating.

In one embodiment, the list of random numbers is sorted in disk order and then the disk blocks corresponding to each random number are read in order. In one embodiment, the disk blocks are classified by type using a method for identifying file fragments, rather than complete files.

It will be clear to one skilled in the art of computer forensics that instead of reading individual disk sectors, multiple contiguous sectors may be read in a single operation as a "block" of data. Typical block sizes are 2, 4, 8 and 16 sectors, although any reasonable number of sectors may be grouped together to form a block.

In accordance with another embodiment, a computer implemented method for determining that a block of high-entropy data is compressed includes: obtaining a block of high-entropy data; performing one or more autocorrelations on the block of high-entropy data to generate an autocorrelated block of data; calculating a cosine similarity metric between the block of high-entropy data and the autocorrelated block; and determining the block of high-entropy data is compressed when the cosine similarity metric is smaller than a predetermined value.

Embodiments in accordance with the invention are best understood by reference to the following detailed description when read in conjunction with the accompanying drawings.

Embodiments in accordance with the invention are further described herein with reference to the drawings.

DETAILED DESCRIPTION OF THE INVENTION

Embodiments in accordance with the invention rapidly determine the forensic contents of a hard disk drive (HDD) or other data storage device using statistical sampling. More particularly, embodiments in accordance with the invention statistically infer the forensic contents of a hard disk drive by evaluating a random sample of the hard disk drive's sectors. Herein the phrase "forensic contents" denotes the actual contents of the hard disk drive, rather than the contents that are only visible through the file system. Herein the term "hard disk drive" or "hard drive" generically refers to any computer storage device, such as a hard drive, a USB memory stick, a flash storage device used with a digital camera, a CD-ROM or DVD-ROM, a magnetic tape, or other random or sequential access storage devices. In one embodiment, a method for determining hard disk drive contents through statistical drive sampling is implemented in a computer device including a conventional computing system running a conventional operating system designed to generally manage operations of the computing device. In addition, embodiments can be implemented on computing devices other than a conventional computing device, such as for example, a personal digital assistant (PDA), a cell phone, or other computing device capable of processing computer readable data.

Figure 1:
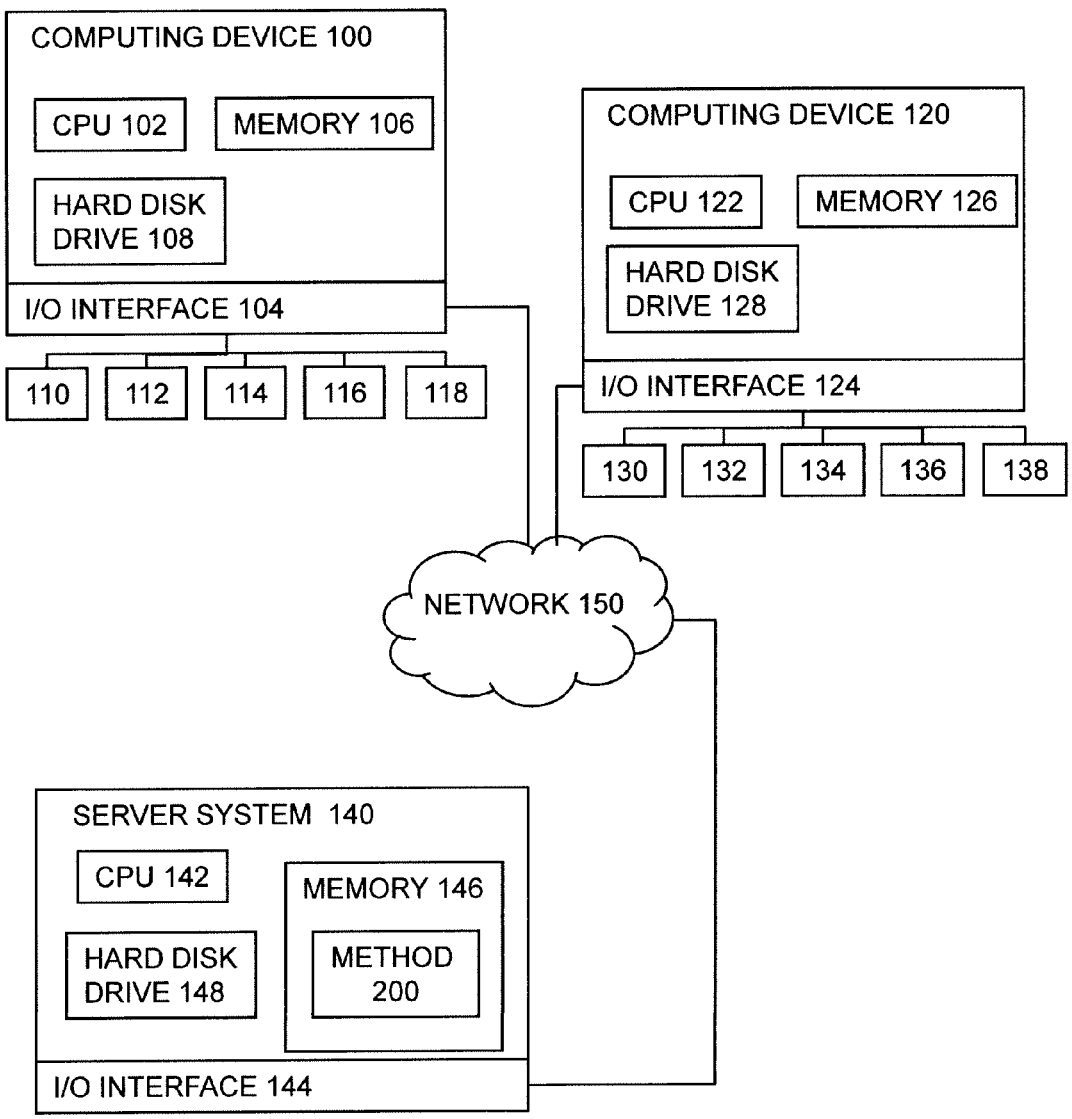
FIG. 1 is a block diagram of an exemplary hardware architecture for implementing a method for determining hard drive contents through statistical drive sampling in accordance with one embodiment.

Referring now to FIG. 1, FIG. 1 is a block diagram of an exemplary hardware architecture for implementing a method for determining hard drive contents through statistical sampling in accordance with one embodiment. As shown in FIG. 1, a computing device 100 typically includes a central processing unit (CPU) 102, hereinafter processor 102, an input/output (I/O) interface 104, one or more hard disk drive(s) 108, and a memory system 106, including one or more cache memories (not shown). Computing device 100 may further include standard user interface devices such as a keyboard 110, a mouse 112, a printer 114 and a display device 116, as well as one or more standard I/O devices 118 capable of inputting data to and outputting data from computing device 100. As discussed in more detail below, in one embodiment, a method for determining hard drive contents through statistical drive sampling 200, herein also referred to as method 200, can be loaded, in whole, or in part, into computing device 100 via I/O device 118, such as from a CD, DVD, or other transfer mechanism containing all, or part, of method 200. In some embodiments, method 200 can be implemented on computing device 100 remotely via a network, such as remotely from a server system 140 via a network 150, or from a computing device 120 via network 150.

Computing device 100 can be networked with other computing devices, such as a computing device 120. Similarly, computing device 120 typically includes a CPU 122, hereinafter processor 122, an I/O interface 124, one or more hard disk drive(s) 128, and a memory system 126, including one or more cache memories (not shown). Like computing device 100, computing device 120 may further include standard user interface devices, such as keyboard 130, a mouse 132, a printer 134, and a display device 136, as well as one or more standard I/O devices 138 capable of inputting data to and outputting data from computing device 120.

In one embodiment, computing devices 100 and 120 can be coupled to a server system 140 by network 150. Server system 140 typically includes a server system CPU 142, hereinafter server processor 142, a server system I/O interface 144, one or more server system hard disk drive(s) 148, and a server system memory system 146, including one or more cache memories (not shown). Server system 140 may further include standard user interface devices (not shown), such as keyboard, a mouse, a printer, and a display device, as well as one or more standard I/O devices capable of inputting data to and outputting data from server system 140. In some embodiments, method 200 can be stored in whole or in part in server system 140.

Figure 2:
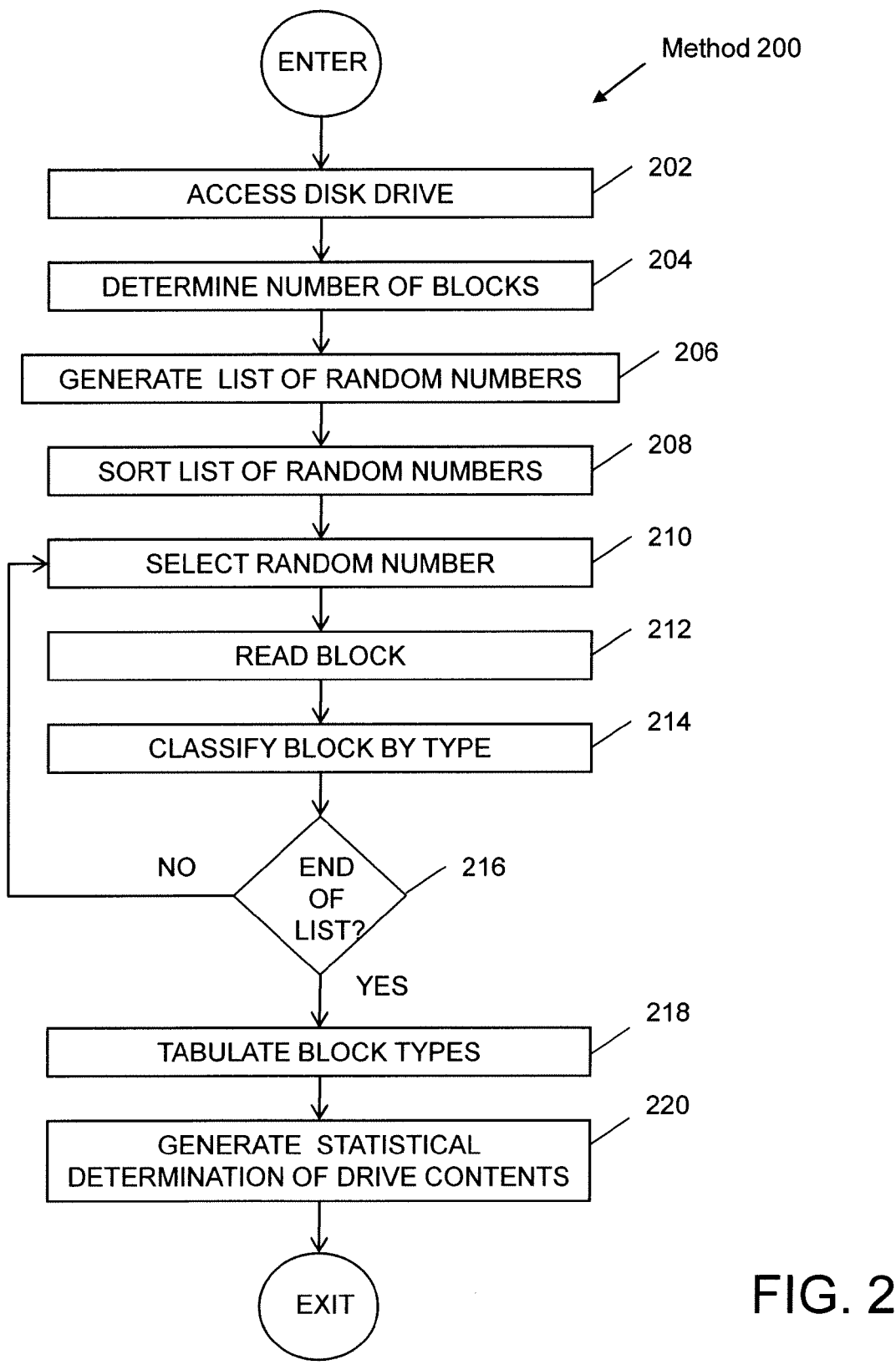
FIG. 2 is a process flow diagram illustrating a method for determining hard drive contents through statistical drive sampling in accordance with one embodiment.

Referring now to FIGS. 1 and 2, FIG. 2 is a process flow diagram illustrating a method 200 for determining hard disk drive contents through statistical drive sampling in accordance with one embodiment. In one embodiment, method 200 is implemented on computing device 100 to determine the contents of hard disk drive 108 through statistical drive sampling. On initiation, method 200 is entered at an ACCESS DISK DRIVE operation 202.

In ACCESS DISK DRIVE operation 202, a selected disk drive, such as hard disk drive 108 is accessed, such as by using a disk drive access command which allows access and reading of disk sectors and disk contents on a disk drive. Accessing of a disk drive is well known to those of skill in the art and not further detailed herein. From ACCESS DISK DRIVE operation 202, processing continues to a DETERMINE NUMBER OF BLOCKS operation 204.

In DETERMINE NUMBER OF BLOCKS operation 204, the number of blocks on the disk drive accessed in operation 202 is determined. In one embodiment, the number of sectors on a disk drive is determined, such as by using a command which determines the number of sectors on a disk drive. Determination of the number of sectors on a disk drive is well known to those of skill in the art and not further detailed herein. The number of blocks is then calculated by taking the number of sectors on the hard drive and dividing by the number of blocks per sector. From DETERMINE NUMBER OF BLOCKS operation 204, processing continues to a GENERATE LIST OF RANDOM NUMBERS operation 206.

In GENERATE LIST OF RANDOM NUMBERS operation 206, a list of random numbers is generated. In one embodiment, a list of random numbers between 0 and the number of blocks determined in operation 204 is generated. For example, any one of various conventional random number generators can be used to generate the list of random numbers. Generation of a list of random numbers is well known to those of skill in the art and not further detailed herein. From GENERATE LIST OF RANDOM NUMBERS operation 206, processing continues to a SORT LIST OF RANDOM NUMBERS operation 208.

In SORT LIST OF RANDOM NUMBERS operation 208, the list of random numbers generated in operation 206 is sorted. More particularly, in one embodiment, each random number in the list of random numbers is sorted in disk order, i.e., each random number is placed in order on the list of random numbers in accordance with the disk order. In one embodiment, the list of random numbers is sorted in linear increasing disk order because it is faster to read the blocks in linear increasing order than randomly. This minimizes the number of seeks performed by the disk head. Sorting of a list of random numbers in a specified order is well known to those of skill in the art and not further detailed herein. From SORT LIST OF RANDOM NUMBERS operation 208, processing flows to a SELECT RANDOM NUMBER operation 210.

In SELECT RANDOM NUMBER operation 210, a random number in the list of random numbers is selected. In one embodiment, initially, a first random number at the beginning of the sorted list of random numbers is selected. Selection of a random number from a list of ordered random numbers is well known to those of skill in the art and not further detailed herein. In one embodiment, subsequent selections of random numbers in accordance with the method continue to be selected in order from the sorted list of random numbers. From SELECT RANDOM NUMBER operation 210, processing continues to a READ BLOCK operation 212.

In READ BLOCK operation 212, the block corresponding to the random number selected in operation 210 is read from the disk drive, e.g. hard disk drive 108. Reading of block on a hard disk drive is well known to those of skill in the art and not further detailed herein. From READ BLOCK operation 212, processing flows to a CLASSIFY BLOCK BY TYPE operation 214.

In CLASSIFY BLOCK BY TYPE operation 214, the block read in operation 212 is classified according to a block type. Herein the term "classified" denotes that the data read from a block is analyzed with one or more block classification method(s) and a block type (e.g., block identifier) is assigned to the block. In one embodiment, the one or more classification method(s) takes a single block and makes a classification of the file from which the block is taken and assigns a type to the block. This is useful for finding data blocks outside of the file system, which may be parts of files, or random data directly written across the drive.

In one embodiment, the block type is determined using a method that classifies a block by type based on a file fragment in the block. In one embodiment, a fast Bloom filter implementation for use with MD5, SHA1 or SHA256 hash codes and the (National Software Reference Library) NSRL is used as the fragment classifier. This fragment classification method and its evaluation is described below and is also described in the article "Using purpose-built functions and block hashes to enable small block and sub-file forensics" by Simson Garfinkel, Alex Nelson, Douglas White and Vassil Roussev, *DFRWS* 2010 (Portland, Oreg.), hereby incorporated in its entirety by reference.

In one embodiment, five (5) data classifiers are utilized to classify a block: a NULL classifier, a known file fragment classifier, a JPEG classifier, an MP3 classifier, and a Huffman coded classifier.

In one embodiment, the Null classifier recognizes empty blocks. The Null classifier has an F-Score of 1.0. As is well known, an F-Score is a statistical measure of the accuracy of a discrimination test, with a score of 1.0 being perfect and a score of 0.0 being the worst possible score. The easiest block to classify is the blank block: all of the bytes are ASCII 0 (NULL).

In one embodiment, the known file fragment classifier classifies fragments of known files based on their cryptographic hash code. In one embodiment, the content within a disk block is identified by recognizing a file fragment from a database of known file fragments. In one embodiment, the recognition of specific files is afforded by the National Institute of Standards and Technology NSRL reference data set (RDS) block hash database, which hashes files at 4096 byte intervals. In one embodiment, where a file does not have a content size that is a multiple of 4096, the file is padded with NUL (00) bytes to a size that is a multiple of 4096.

The block hashes of files enable several investigative techniques. The smaller granularity of the block hashes can be used to find statistically similar files, based on the number of matching blocks. A physical device can be accessed and block hashes generated without the need for an operating system or file.

In one embodiment, the known file fragment classifier can characterize 4096-byte fragments from files based on the hash code of the fragment. This fragment classifier relies on the fact that most modern file systems store files aligned at sector boundaries. One complication of using block hashes for file recognition is that blocking of a file may not cleanly align with the blocking of a file system when it is resident on a device with a smaller block size. For example, when a file is stored on a conventional hard drive with 512-byte sectors, the file's first byte may begin at block 1026, rather than block 1024. To overcome this problem, the fragment recognizer reads 15 sequential 512 byte sectors and computes 8 different hashes, one starting at offset n, a second starting at offset n+512 and so on. This reblocking is not necessary with disks that have 4096-byte sectors when using 4096-byte blocks, but is necessary if a larger block size is employed.

In one embodiment, the JPEG classifier identifies a block based on two characteristics revealed with unigram and bigram analysis, treating byte as gram. JPEG data has high entropy, so the number of distinct unigrams would come close to 256. JPEGs also use byte sequences starting with FF as instructions. However, FF is also allowed to be graphical data, so the JPEG standard specifies representing these natural FFs by "stuffing" them, storing FF00.

In one embodiment, the JPEG classifier accepts a block as JPEG data if the entropy is considered high—the parameter High Entropy (HE) represents this threshold. If a block does not have at least HE distinct unigrams, the block is rejected. This classifier also assumes a block has some minimal number of FF00 occurrences, low FF00 N-gram Count (LN). In trials it is found that at least 2 FF00 bigrams and at least 220 distinct unigrams can identify a block as JPEG with 99.28% accuracy.

In one embodiment, the MP3 classifier detects MP3 fragments by finding MP3 frame headers, performing "sanity" checks on several coding values, and then scanning forward to the next MP3 frame header and checking to see if it is present or not. MP3 files have an easily identified structure. MP3 data is a stream of frames, where each frame has a 4-byte header containing metadata for only the current frame.

Frame headers have two properties amenable to fragment identification: each frame header starts with a string of sync bits, 11 or 12 set bits; and the length of the frame is exactly calculable from the header. To identify a fragment as MP3, the fragment is scanned until a byte pair is found that looks like it has sync bits. The frame's bit rate, sample rate and padding flag are extracted from their binary representation in the header and the frame length is calculated according to the formula: FrameSize=(144×BitRate)/Sample Rate+Padding.

In one embodiment, if another frame header is found at the calculated offset, it is very likely the fragment is an MP3. Alternatively, if another frame header is not found, it is likely something that looked like a header was identified and happened to not present any impossibly-coded values.

In one embodiment, the number of times another frame header is sought is a tunable parameter of this classifier: a chain length is a count of skips after finding the initial header (edges in a graph, not vertices). In trials it is found that finding four chained headers after finding one header identified MP3 data with accuracy of 99.56%.

In one embodiment, the Huffman-coded compressed data classifier detects Huffman-coded compressed data fragments through the use of an autocorrelation test. Huffman coding is widely used in computer file formats in the DEFLATE compression algorithm behind compressed file formats, such as ZIP, GZIP, and PNG. Compressed objects can be difficult to distinguish from other high entropy objects, including random objects and encrypted data. For the purposes of computer forensics, it can be informative to distinguish compressed data from random or encrypted data.

In one embodiment, a series of autocorrelations are produced by rotating the input buffer between 1 and 5 bytes and performing a function byte-by-byte on the original buffer and the rotated buffer, producing a third buffer. The resulting autocorrelation buffers are tested for high entropy. If any of the resulting autocorrelation buffers fails a high-entropy test, then a correlation existed between the original buffer and the shifted buffer. The inventors theorize this correlation exists because of repeated symbols produced by Huffman coding that are not byte-aligned. This result implies that the input was not random (or encrypted) and the buffer is deemed to be Huffman coded.

In one embodiment, a histogram vector is produced for the original block containing for each unigram a count of the number of times each value is represented in the block. This histogram, and others in the method described in this paragraph, is sorted by popularity of the bin (i.e. the first bin has the highest count). An autocorrelation is then performed on the original block by performing a function byte-by-byte on the original buffer and the rotated buffer, producing a third buffer. A second histogram vector is produced for the third buffer. The cosine similarity metric is then computed by determining the difference in 256-dimensional space between the two vectors. The resulting cosine is then evaluated: if the cosine of the angle is smaller than a predetermined value, called the Minimum Cosine Value (MCV), the data is deemed to be non-random and therefore Huffman coded.

In one embodiment, only a subset of the most common unigrams is used for the calculation of the cosine value. This subset is called the VL (Vector Length). In one set of tests it is found that a Vector Length of 250 produced optimal results for 16KiB blocks.

In one embodiment, a combination of tests is utilized. In one embodiment, a histogram of the input buffer is computed. If there are less than a certain number of distinct byte unigrams, then the input buffer is not high entropy. In another embodiment, if the difference between the number of the most popular unigram and the second to most popular unigram is greater than a certain number, the input buffer is not high entropy. In other embodiments, additional tests for entropy can be used. However, the problem with using more tests is that each additional test increases the possibility that random data might match one of the tests. One embodiment of a method for classifying blocks by type is further described with reference to method 300 and FIG. 3. From CLASSIFY BLOCK BY TYPE operation 214, processing continues to END OF LIST check operation 216.

In END OF LIST check operation 216, a determination is made whether the end of the list of random numbers is reached. More particularly, a determination is made whether there are remaining random numbers on the sorted list of random numbers to be processed. Upon a determination the end of the list of random numbers has not been reached ("NO"), from END OF LIST check operation 216, processing returns to SELECT RANDOM NUMBER operation 210, with selection of a next random number in the sorted list of random numbers. Alternatively, upon a determination the end of the list of random numbers has been reached ("YES"), from END OF LIST check operation 216, processing continues to a TABULATE BLOCK TYPES operation 218.

In TABULATE BLOCK TYPES operation 218, each block type classified in operation 214 is tabulated by block type. In one embodiment, upon completion of the classification of each of the blocks by type, each of the typed blocks is tabulated according to type. Typically this is performed with the specific outputs from the block discrimination functions (i.e., operation 214).

In embodiments in which a block classification method generates a probability that a block may be one type or another, the tabulations may be selectively weighted. For example, a block classification method may state that there is a 60% probability that a block is from a compressed file and a 40% probability that the block is from an encrypted file. In this case, in one embodiment, the tabulations may be weighted.

In one embodiment, any blocks having types that are not recognized, or are classified as "Other", are simply tabulated as "Other." From TABULATE BLOCK TYPES operation 218, processing continues to a GENERATE STATISTICAL DETERMINATION OF DRIVE CONTENTS operation 220.

In GENERATE STATISTICAL DETERMINATION OF DRIVE CONTENTS operation 220, a statistical determination of the hard drive contents is generated. Herein the probability that a random variable X will be exactly x is governed by the well-known hypergeometric distribution with the binomial distribution approximation:

$$P(X=0)=b(0;n, M/N)=(1-M/N)^n,$$

where P is the probability of not finding a block with data, X is the random variable, n is the sample size, M is the number of a specified block classification, and N is the total number of blocks.

Thus, for example the probability of not finding any of 10 MB of data for a given number of randomly sampled blocks is 0.00673 for 500,000 sampled blocks. Given the above approximation, once random blocks are read and classified in accordance with the invention, the probability of not finding a block of a given classification can be reported as a simple confidence interval. Or reported conversely, the probability of a given classification of data on a hard disk drive can be reported within a simple confidence level.

In one embodiment, blocks of 4096 bytes or another value can be used instead of disk blocks, allowing for fewer samples to be made.

In one embodiment, a report of the percentage of each type of block that has been classified is generated. It is assumed that the statistics of the tabulated blocks match those of the entire disk. In this way the statistics of the tabulated blocks can be viewed as matching the statistics of the hard disk as a whole.

The statistical determination can be saved by storing the data, in whole, or in part, using any one of numerous mechanisms known to those of skill in the art. For example, the generated statistical determination can be stored in a memory system, such as on computing device 100, computing device 120, or server system 140. As other examples, the statistical determination can be output in printed form, saved to a removable storage device, or transmitted over network 150 to a receiving device, such as server system 140. From GENERATE STATISTICAL DETERMINATION OF DRIVE CONTENTS operation 220, processing exits method 200. In some embodiments, in exiting method 200, access to the hard disk drive is closed.

Figure 3A:
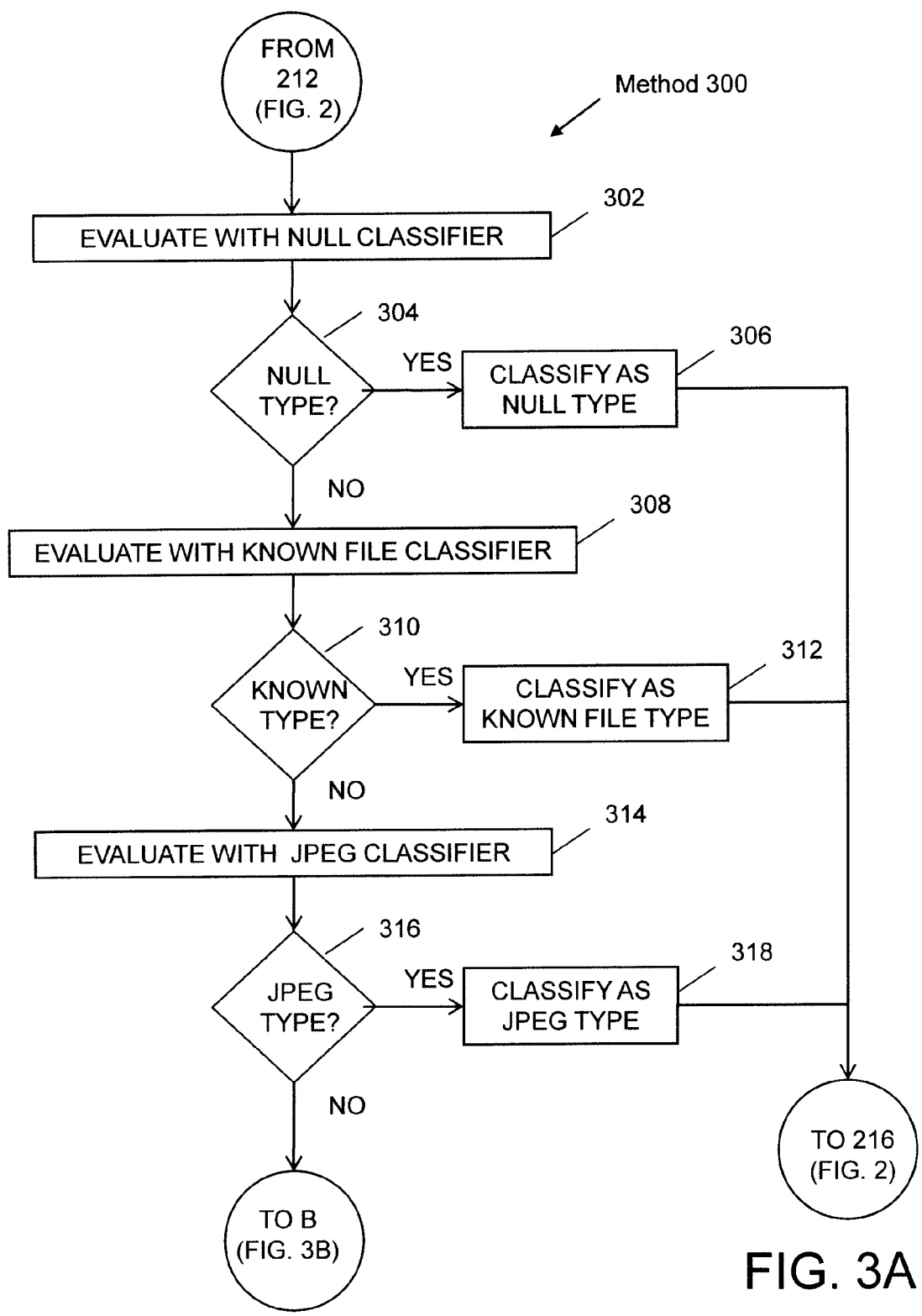
FIGS. 3A and 3B together are a process flow diagram illustrating a method for classifying blocks by type in accordance with one embodiment.
Figure 3B:
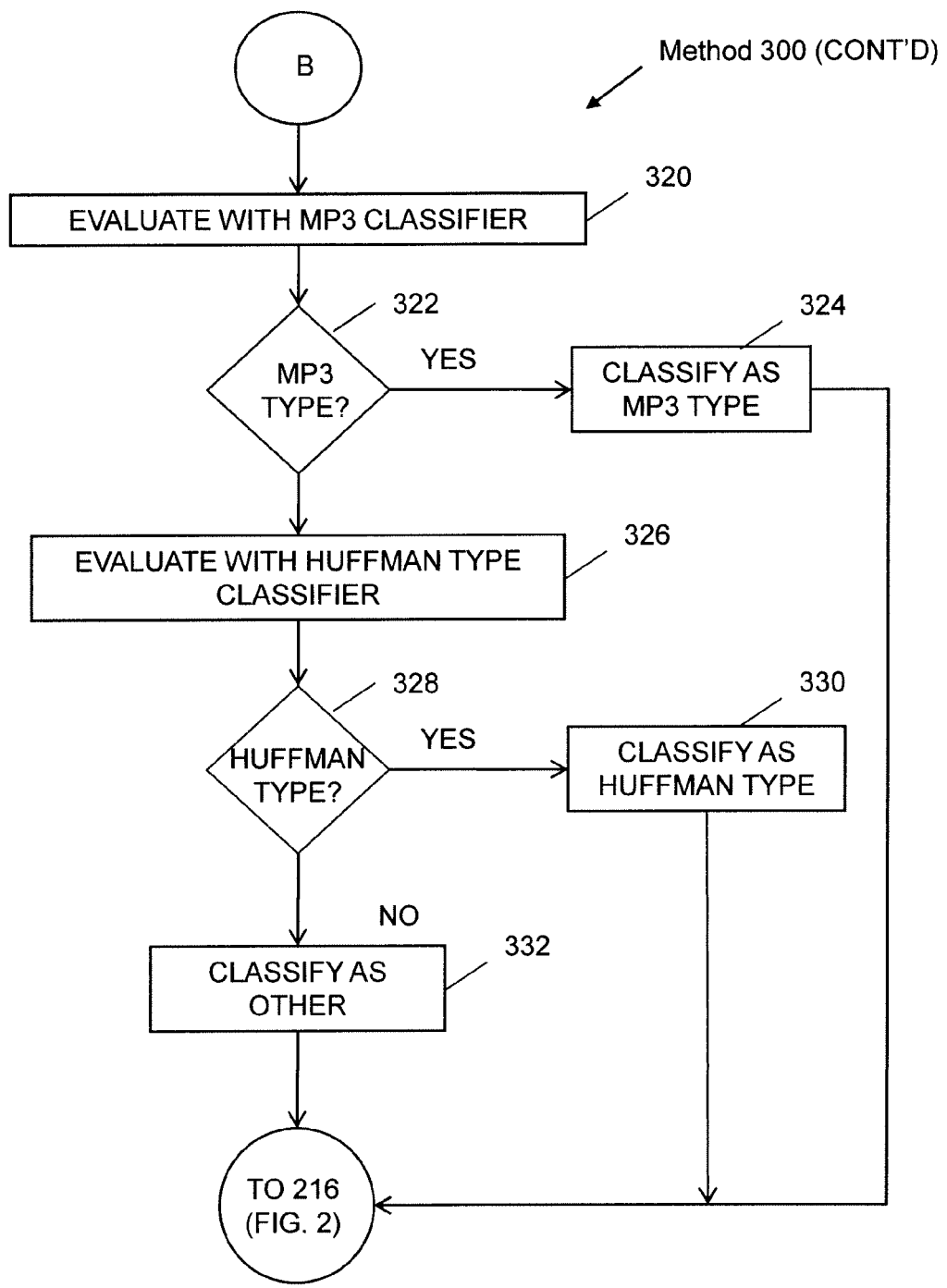

FIGS. 3A and 3B together are a process flow diagram illustrating a method 300 for classifying blocks by type in accordance with one embodiment. Referring initially to FIG. 2 and FIG. 3A, in one embodiment, from operation 212, processing enters method 300 and continues to an EVALUATE WITH NULL CLASSIFIER operation 302.

In EVALUATE WITH NULL CLASSIFIER operation 302, the block read in operation 212 is evaluated by a null classification method as earlier described to determine whether the block is a null type. From EVALUATE WITH NULL CLASSIFIER operation 302, processing continues to a NULL TYPE check operation 304.

In NULL TYPE check operation 304, a determination is made whether the block was determined a null type in operation 302. If the block is determined a null type in operation 302 ("YES"), processing continues to CLASSIFY AS NULL TYPE operation 306 with the block being classified as a null type and processing exiting method 300 and continuing to operation 216 (FIG. 2).

Alternatively, if the block is not determined a null type in operation 302 ("NO"), processing continues to an EVALUATE WITH KNOWN FILE CLASSIFIER operation 308.

In EVALUATE WITH KNOWN FILE CLASSIFIER operation 308, the block read in operation 212 is evaluated by a known file classification method as earlier described to determine whether the block is a known file type. From EVALUATE WITH KNOWN FILE CLASSIFIER operation 308, processing continues to a KNOWN FILE TYPE check operation 310.

In KNOWN FILE TYPE check operation 310, a determination is made whether the block was determined a known file type in operation 308. If the block is determined a known file type in operation 308 ("YES"), processing continues to CLASSIFY AS KNOWN FILE TYPE operation 312 with the block being classified as a known file type and processing exiting method 300 and continuing to operation 216 (FIG. 2).

Alternatively, if the block is not determined a known file type in operation 308 ("NO"), processing continues to an EVALUATE WITH JPEG CLASSIFIER operation 314.

In EVALUATE WITH JPEG CLASSIFIER operation 314, the block read in operation 212 is evaluated by a JPEG classification method as earlier described to determine whether the block is a JPEG file type. From EVALUATE WITH JPEG CLASSIFIER operation 314, processing continues to a JPEG TYPE check operation 316.

In JPEG TYPE check operation 316, a determination is made whether the block was determined a JPEG file type in operation 314. If the block is determined a JPEG file type in operation 314 ("YES"), processing continues to a CLASSIFY AS JPEG TYPE operation 318 with the block being classified as a JPEG type and processing exiting method 300 and continuing to operation 216 (FIG. 2).

Alternatively, if the block is not determined a JPEG file type in operation 316 ("NO"), processing continues to an EVALUATE WITH MP3 CLASSIFIER operation 320.

Referring now to FIG. 3B, in EVALUATE WITH MP3 CLASSIFIER operation 320, the block read in operation 212 is evaluated by a MP3 classification method as earlier described to determine whether the block is an MP3 file type. From EVALUATE WITH MP3 CLASSIFIER operation 320, processing continues to a MP3 TYPE check operation 322.

In MP3 TYPE check operation 322, a determination is made whether the block was determined an MP3 type in operation 320. If the block is determined an MP3 type in operation 320 ("YES"), processing continues to CLASSIFY AS MP3 TYPE operation 324 with the block being classified as an MP3 type and processing exiting method 300 and continuing to operation 216 (FIG. 2).

Alternatively, if the block is not determined an MP3 file type in operation 320 ("NO"), processing continues to an EVALUATE WITH HUFFMAN TYPE CLASSIFIER operation 326. In EVALUATE WITH HUFFMAN TYPE CLASSIFIER operation 326, the block read in operation 212 is evaluated by a Huffman type classification method as earlier described to determine whether the block is a Huffman file type. From EVALUATE WITH HUFFMAN TYPE CLASSIFIER operation 326, processing continues to a HUFFMAN TYPE check operation 328.n HUFFMAN TYPE check operation 328, a determination is made whether the block was determined a Huffman type in operation 326. If the block is determined a Huffman type in operation 326 ("YES"), processing continues to a CLASSIFY AS HUFFMAN TYPE operation 330 with the block being classified as a Huffman type and processing exiting method 300 and continuing to operation 216 (FIG. 2).

Alternatively, if the block is not determined a Huffman type in operation 326 ("NO"), processing continues to a CLASSIFY AS OTHER operation 332 with the block being classified as "Other" and processing exiting method 300 and continuing to operation 216 (FIG. 2).

Those of skill in the art can recognize that the particular operations, and order of performing the operations, shown above with reference to method 300 are illustrative of one embodiment, and that a different order and/or a lesser or greater number of classification methods can be implemented, based for example on the needs of the user.

Figure 4:
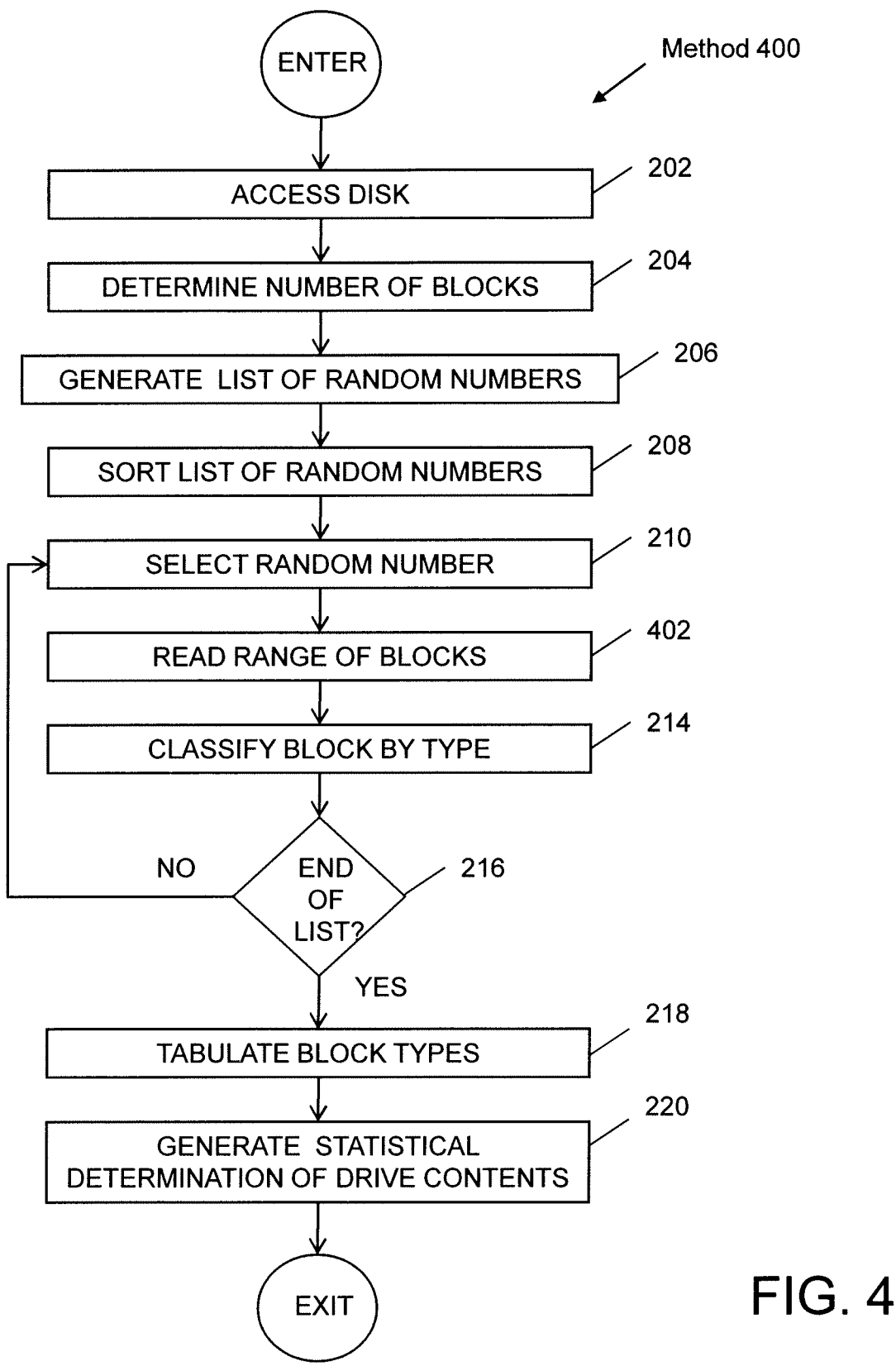
FIG. 4 is a process flow diagram illustrating a method for determining hard drive contents through statistical drive sampling in accordance with a second embodiment.

In another embodiment, rather than reading just the data of the block corresponding to the random number selected in operation 210, data in a range of blocks is read. Referring now to FIG. 4, FIG. 4 is a process flow diagram illustrating a method 400 for determining hard drive contents through statistical drive sampling in accordance with a second embodiment. In method 400 operations 202 through 210 and operations 214 through 220 are performed substantially the same as earlier described with reference to FIG. 2 and method 200. Differently in method 400, rather than reading the single disk block corresponding to the random number (operation 212), a range of blocks centered on the corresponding disk block is read and used in classifying the single block.

Referring now to FIG. 4 and method 400, in one embodiment, on exiting operation 210 processing continues to a READ RANGE OF BLOCKS operation 402.

In READ RANGE OF BLOCKS operation 402, a range of blocks from N−m to N+m is read, where N is the selected block (i.e. the block corresponding to the random number selected in operation 210) and m the specified byte count value. In one embodiment, m is the value resulting from 32768 bytes divided by the block size, so that a total of 64K of data are read centered on the block that is to be analyzed. The additional blocks are useful in determining what kind of data is present in the blocks. For example, continuing the earlier example, assuming a block size is 512 bytes, if a block 400 is selected, N equals 400 and m equals 64 (32768 bytes/512 bytes=64). Thus, the block range is read from block 336, N−m=400−64=336, to block 464, N+m=400+64=464.

As another example, if the block size is 4096 bytes rather than 512 bytes, N equals 50 and m equals 8 (32768 bytes/4096 bytes=8). Thus, the block range is read from block 42 (400−8=42) to block 58 (50+8=58). From READ RANGE OF BLOCK operation 402 processing continues to CLASSIFY BLOCK BY TYPE operation 214 in which the selected block is classified based on the sequence of data obtained in operation 402. More particularly, in one embodiment, a classification method takes the sequence of data obtained in operation 402 and makes a determination or classification of the file from which the block is taken and assigns a type to the block based on the classification of the file. From CLASSIFY BLOCK BY TYPE operation 214 processing continues to operations 216 through 220 as earlier described with reference to method 200.

Those of skill in the art can recognize the wide applicability of embodiments of the invention. For example, when a hard drive is removed from service, it is necessary to verify that the drive has been properly cleared prior to repurposing or disposal. Embodiments in accordance with the invention can be used to quickly verify the proper clearing.

As another example, embodiments in accordance with the invention can be applied to hard disk drives and USB (universal serial bus) storage devices leaving hospitals, law firms, and other facilities to rapidly verify that the only data on these devices are encrypted.

As a further example, embodiments in accordance with the invention can be applied in law enforcement or military context to triage drives by comparing the amount of data on each device as reported by the file system with the actual amount of determined data.

In a still further example, embodiments in accordance with the invention can be applied at border crossing and checkpoints, where officials have a very short time to screen an electronic device before determining whether to let the device pass or to perform an exhaustive search of the device.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

Some portions of the above-description may present portions of the invention in terms of algorithms and symbolic representations of operation, or algorithm-like representations, of operations on data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing devices.

Further portions of the invention include operations in an algorithmic-like form. It should be noted that the operations and instructions can be embodied in software, firmware and/or hardware, and when embodied in software, can be downloaded to reside on and operated from different platforms used by real time network operating systems.

Embodiments in accordance with the invention can be embodied as a computer program product that can be accessed by a computer device or other devices. Herein a computer program product is a medium configured to store or transport computer readable code. Some examples of computer program products are CD-ROM discs, DVD-ROM discs, floppy discs, magnetic tapes, computer hard drives, server systems, such as server system 140, or other media forms capable of delivering computer readable data representing computer readable code.

Those of skill in the art will readily recognize that the embodiments presented herein are not inherently related to any particular computer device, computer architecture, computer or industry standard, or any other specific apparatus.

What is claimed is:

1. A computer implemented method for determining storage device contents through statistical sampling comprising:
   accessing a storage device;
   determining the total number of blocks on said storage device;
   generating a list of random numbers, said list of random numbers including a plurality of random numbers;
   sorting said list of random numbers, wherein said sorting positions each of said plurality of random numbers in said list of random numbers in a selected order;
   selecting each of said plurality of random numbers in said list of random numbers according to said order;
   reading a block on said storage device corresponding to each of said plurality of random numbers;
   classifying each said block by a type;
   tabulating each block type; and
   generating a statistical determination of the contents of said storage device based on said tabulating.

2. The computer implemented method of claim 1 wherein said list of random numbers comprises a range from 0 to said total number of blocks on said storage device.

3. The computer implemented method of claim 1 wherein said selected order is in increasing disk order.

4. The computer implemented method of claim 1 wherein said classifying each said block by a type comprises:
   determining whether a block is a null type,
      wherein if said block is determined a null type, classifying said block as a null type;
   otherwise determining whether said block is a known file type,
      wherein if said block is determined a known file type, classifying said block as a known file type;
   otherwise determining whether said block is a JPEG type, wherein if said block is determined a JPEG type, classifying said block as a JPEG type;
   otherwise determining whether said block is an MP3 type, wherein if said block is determined an MP3 type, classifying said block as an MP3 type;
   otherwise determining whether said block is a Huffman type,
      wherein if said block is determined a Huffman type, classifying said block as a Huffman type;
   otherwise classifying said block as an other type.

5. The computer implemented method of claim 4 wherein said determining whether said block is a Huffman type comprises:
   performing one or more autocorrelations on said block to generate an autocorrelated block;
   calculating a cosine similarity metric between said block and said autocorrelated block; and
   determining said block a Huffman type when said cosine similarity metric is smaller than a predetermined value.

6. A computer implemented method for determining storage device contents through statistical sampling comprising:
   accessing a storage device;
   determining the total number of blocks on said storage device;
   generating a list of random numbers, said list of random numbers including a plurality of random numbers;
   sorting said list of random numbers, wherein said sorting positions each of said plurality of random numbers in said list of random numbers in a selected order;
   selecting each of said plurality of random numbers in said list of random numbers according to said order;
   reading a range of blocks on said storage device centered on each of said plurality of random numbers corresponding to each of said plurality of random numbers;
   classifying each said block by a type;
   tabulating each block type; and
   generating a statistical determination of the contents of said storage device based on said tabulating.

7. The computer implemented method of claim 6 wherein said list of random numbers comprises a range from 0 to said total number of blocks on said storage device.

8. The computer implemented method of claim 6 wherein said selected order is in increasing disk order.

9. The computer implemented method of claim 6 wherein said classifying each said block by a type comprises:
   determining whether a block is a null type,
      wherein if said block is determined a null type, classifying said block as a null type;
   otherwise determining whether said block is a known file type,
      wherein if said block is determined a known file type, classifying said block as a known file type;
   otherwise determining whether said block is a JPEG type, wherein if said block is determined a JPEG type, classifying said block as a JPEG type;
   otherwise determining whether said block is an MP3 type, wherein if said block is determined an MP3 type, classifying said block as an MP3 type;
   otherwise determining whether said block is a Huffman type,
      wherein if said block is determined a Huffman type, classifying said block as a Huffman type;
   otherwise classifying said block as an other type.

10. The computer implemented method of claim 9 wherein said determining whether said block is a Huffman type comprises:
    performing one or more autocorrelations on said block to generate an autocorrelated block;
    calculating a cosine similarity metric between said block and said autocorrelated block; and
    determining said block a Huffman type when said cosine similarity metric is smaller than a predetermined value.

11. A computer program product for determining storage device contents through statistical drive sampling comprising:
    a non-transitory computer readable medium; and
    computer readable instructions encoded on said non-transitory computer readable medium, said computer readable instructions for causing a computing device to implement a method comprising:
    accessing a storage device;
    determining the total number of blocks on said storage device;
    generating a list of random numbers, said list of random numbers including a plurality of random numbers;
    sorting said list of random numbers, wherein said sorting positions each of said plurality of random numbers in said list of random numbers in a selected order;

selecting each of said plurality of random numbers in said list of random numbers according to said order;

reading a block on said storage device corresponding to each of said plurality of random numbers;

classifying each said block by a type;

tabulating each block type; and generating a statistical determination of the contents of said storage device based on said tabulating.

12. A computer program product for determining storage device contents through statistical drive sampling comprising:

a non-transitory computer readable medium; and computer readable instructions encoded on said non-transitory computer readable medium, said computer readable instructions for causing a computing device to implement a method comprising:

accessing a storage device;

determining the total number of blocks on said storage device;

generating a list of random numbers, said list of random numbers including a plurality of random numbers;

sorting said list of random numbers, wherein said sorting positions each of said plurality of random numbers in said list of random numbers in a selected order;

selecting each of said plurality of random numbers in said list of random numbers according to said order;

reading a range of blocks on said storage device centered on each of said plurality of random numbers corresponding to each of said plurality of random numbers;

classifying each said block by a type;

tabulating each block type; and generating a statistical determination of the contents of said storage device based on said tabulating.

13. A computer implemented method for determining that a block of high-entropy data is compressed comprising:

obtaining a block of high-entropy data;

performing one or more autocorrelations on said block of high-entropy data to generate an autocorrelated block of data;

calculating a cosine similarity metric between said block of high-entropy data and said autocorrelated block; and determining said block of high-entropy data is compressed when said cosine similarity metric is smaller than a predetermined value.

* * * * *